3,547,645
PREPARATION OF DIMENSIONALLY STABLE PHOTOGRAPHIC FILMS

Horst Buchwald, Neu-Isenburg, Bernward Mülders, Jugesheim, and Rudolf Schneider, Neu-Isenburg, Germany, assignors to E. I. du Pont de Nemours and Company, Wilmington, Del., a corporation of Delaware
No Drawing. Filed Mar. 3, 1967, Ser. No. 620,243
Claims priority, application Germany, July 27, 1966, A 53,111
Int. Cl. G03c 1/78, 1/80
U.S. Cl. 96—87         4 Claims

ABSTRACT OF THE DISCLOSURE

A photographic cellulose ester film base comprising a cellulose ester containing about 1 to 25% by weight of a natural or synthetic resin such as polypropylene glycol adipate and at least 5% by weight of a low molecular weight plasticizer such as triphenyl phosphate.

---

The invention relates to a process for the production of dimensionally stable photographic films with a support made from organic cellulose esters. This invention also relates to the novel products herein described.

It is known that photographic films undergo changes in dimensions under the influence of changing climatic conditions. Changes in the dimensions also occur during the processing of photographic films, even when this takes place under constant climatic conditions. Under the generally prolonged action of the aqueous, sometimes strongly alkaline processing baths, the film first swells, then shrinks during the subsequent drying process. The resulting changes in dimensions are irreversible, i.e., the dimensions of the original film are no longer reached, but permanent changes in the dimensions occur. It can generally be shown, e.g., that the films have shrunk after development and drying in relation to the original state at the time of exposure.

However, for very many photographic applications, above all for reproduction, aerial photograph, etc., the requirements regarding the dimensional stability of the film material must be very high. The dimensional stability of photographic films naturally depends mainly on the properties of the film support. The photosensitive layer and above all the nature of the anchoring substrate, particularly the solvents used for the anchoring substrate, also have an adverse effect particularly on the changes in dimensions that occur during processing.

Attempts have already been made to improve the dimensional stability of photographic films by the use of strongly hydrophobic plastics as film supports. The best results in this respect have been obtained with films of polyesters of terephthalic acid and glycol and with polystyrene and polycarbonate films.

However, it is generally known that the intrinsically high dimensional stability of the above-mentioned film supports can be fully utilized only when they are coated with photosensitive emulsions in which at least part of the gelatine is replaced by synthetic plastics. However, such a partial replacement of the gelatine often has a very unfavorable effect on the photographic properties of the emulsions, so that with respect to the photographic quality of the material, a reduced dimensional stability in relation to the uncoated film is still ultimately obtained. Owing to these and other disadvantages, such as difficulties in production and anchoring, the above-mentioned plastics have not become widely used as support for the photosensitive silver halide emulsions, but as before, film supports made from cellulose esters, particularly cellulose triacetate, are used for many purposes.

Despite their excellent mechanical properties, the organic cellulose esters do not yet satisfy the extreme requirements regarding the dimensional stability of the film support for the modern reproduction technique. An object of the present invention is to reduce this deficiency and so to obtain improved dimensionally stable photographic films with a film support made from organic cellulose esters.

It has now been found that the dimensional stability, during processing, of photographic films having a film support made from organic cellulose esters, an adhesive layer containing gelatine, and at least one photosensitive layer of silver halide emulsion can be greatly improved if 1 to 25%, but preferably 5 to 15%, of a natural and/or synthetic resin based on the amount of cellulose ester, is added to the casting solution for the production of the cellulose ester support, in addition to at least 5% to 20% or more of a conventional low molecular weight plasticizer. The resin used must be soluble in the solvent of the casting solution, particularly methylene chloride, and must be compatible with the cellulose ester used for the production of the film support, particularly cellulose triacetate, and with the low molecular weight plasticizer used.

The action of such a combination, i.e., low molecular weight plasticizer and natural and/or synthetic resin on the dimensional stability during processing of cellulose ester photographic films in the various production stages is illustrated in the following table where the plasticizer is triphenyl phosphate and the resin is Laporal S is a rosin containing a condensation product.

TABLE

| Plasticizer content percent | Resin content percent | Dimensional stability, percent (20° C., 65% RH) | | |
|---|---|---|---|---|
| | | No anchoring substrate | With anchoring substrate | With substrate and emulsion coat |
| 0 | 0 | +0.090 | −0.190 | −0.220 |
| | 5 | +0.090 | −0.145 | −0.175 |
| | 10 | +0.090 | −0.120 | −0.150 |
| | 15 | +0.090 | −0.100 | −0.130 |
| | 20 | +0.090 | −0.080 | −0.110 |
| 7.5 | 0 | +0.060 | −0.130 | −0.169 |
| | 5 | +0.060 | −0.085 | −0.115 |
| | 10 | +0.060 | −0.060 | −0.090 |
| | 15 | +0.060 | −0.040 | −0.070 |
| | 20 | +0.060 | −0.020 | −0.050 |
| 15 | 0 | +0.030 | −0.070 | −0.100 |
| | 5 | +9.030 | −0.025 | −0.055 |
| | 10 | +0.030 | ±0.000 | −0.039 |
| | 15 | +0.030 | +0.020 | −0.010 |
| | 20 | +0.030 | +0.040 | +0.010 |

It can be seen that the addition of the combination of the present invention will have only a small influence on the dimensional stability of the plain film support during processing, this influence being entirely due to the presence of low molecular weight plasticizer.

On the other hand, the influence of the anchoring substrate on the dimensional stability of the film support is very strongly dependent both on the concentration of the added resin and on the concentration of the low molecular weight plasticizer. As can be seen from the above table, as the amount of resin added is increased, depending on the quantity of low molecular weight plasticizer used, the length can change after processing by between −0.190 and +0.040%, i.e., the amount by which the dimensional stability is displaced by the anchoring substrate depends both on the content of low molecular weight plasticizer in the film support and on the resin content of the film support.

For the finished emulsion-coated film, the dimensional stability during processing, depending on the resin and plasticizer contents, is between −0.220 and +0.010%, the influence of the photosensitive layer itself being independent of the resin and plasticizer content.

As can be seen, the individual effects summarized in the table combine to cause a considerable negative displacement of the processing dimensional stability of the finished film, this displacement varying from 0.310% to 0.020%. In order to reach a satisfactory range of dimensional stabilities for the finished film, i.e. roughly the range 0.000±0.010, in the example given in the table, a low molecular weight plasticizer must be added to the casting solution at a level of 15% (while the amount of resin added must be 15 to 20%. The optimum concentrations used from one case to another naturally differ from one resin to another, and can easily be determined by the expert.

However, a technically useful range of dimensional stabilities can never be reached by the addition of resin alone, without the use of a low molecular weight plasticizer. Thus in order to obtain a useful dimensional stability by the addition of resin alone, the resin content must be increased by above 25%, with the result that the film support becomes completely unusuable with respect to its mechanical properties.

Only when a low molecular weight plasticizer is present in quantities of at least 5% is a resin content of less than 25% sufficient to give film supports that exhibit excellent dimensiona stability without adversely affecting their mechanical properties.

From U.S. Pat. 3,054,673, a photographic film is known whose cellulose ester film support contains a polymeric plasticizer from the group of the polyester resins instead of a low molecular weight plasticizer. However, such a material does not exhibit improved dimensional stability. The results according to the present invention can be achieved only when the casting solution for the production of the film support contains, in addition to a low molecular weight plasticizer at a level of at least 5%, a natural and/or synthetic resin in quantities of from 1 to 25%, but preferably 5 to 15%.

Many nautral and synthetic resins suitable for use in the process of the present invention are known. For the purposes of this process, the resins must satisfy two requirements, as has already been mentioned. On the one hand, they must be soluble in the solvents from which the film support is cast, i.e., preferably in methylene chloride, possibly with the addition of aliphatic alcohols containing from 2 to 4 carbon atoms, and on the other hand, they must be compatible with the cellulose esters used for the production of the film support, particularly cellulose triacetate, and naturally also with the low molecular weight plasticizer used.

Examples of resins that satisfy these requirements are as follows: the natural resins, i.e., rosin and dammar, are particularly suitable. Modified natural resins are also suitable, particularly the esterification products of polyfunctional alcohols or the maleate resins, i.e., products resulting from a diene synthesis from the corresponding resin acids and maleic anhydride.

Synthetic resins such as polyesters obtained by esterification of polybasic acids with polyfunctional alcohols are particularly suitable. Suitable polycarboxylic acids for the preparation of such polyesters are, e.g., succinic acid, adipic acid, sebacic acid, phthalic acid, maleic acid, fumaric acid, and itaconic acid. Partcicularly sutable polyfunctional alcohols are ethylene glycol, proplyene glycol, butanediol, glycerin, pentaerythritol, etc. The alkyd resins, i.e., polyesters of polycarboxylic acids and polyalcohols modified with monocarboxylic acids, are also suitable. The principal monocarboxylic acids used for modification are those occurring in the drying and non-drying oils. Moreover, the polymerization products of coumarone and indene known as coumarone-indene resins, which are obtained on fractionation of crude solvent naphtha of coal tar, are also very satisfactory. The same is true of modified coumarone-indene resins, e.g., hydrogenated products, as well as phenol- or cresol-modified resins or even polymers modified by the incorporation of fatty acid esters. It is also advantageous to use synthetic resins obtained by condensation of ketones with aldehydes, particularly formaldehyde. Suitable ketone components for the production of these products are aliphatic ketones such as acetone and methyl ethyl ketone, aliphatic-aromatic ketones such as acetophenone, and cycloaliphatic ketones such as cyclohexanone.

Finally, sulfonamide resins prepared by the condensation of aldehydes with compounds containing one or more sulfonamide groups are also very suitable. Resins prepared from arylsulfonamides, particularly p-toluene-sulfonamide and formaldehyde, are particularly valuable.

The natural and synthetic resins may be added directly to the cellulose ester solution or may be dissolved in the solvent or solvent mixture used for the dissolution of the cellulose ester. It may be advantageous in many cases to add mixtures of different resins, as in the following Example 4. This has the advantage of compensating for any unfavorable effects of one resin component, e.g., on the mechanical properties of the film, by the addition of a second resin component that does not exhibt these unfavorable properties.

Low molecular weight plasticizers that may be used in the process of the present invention include above all phosphate esters such as triphenyl phosphate and tricresyl phosphate or phthalate esters such as diethyl phthalate, dibutyl phthalate, or dioctyl phthalate. However, other types of plasticizers may also be used.

Organic cellulose esters that may be used for the process of the present invention are e.g. cellulose acetate, cellulose propionate, cellulose acetopropionate, or cellulose acetobutyrate. However, a particularly suitable cellulose ester is cellulose triacetate with an acetic content of 60 to 62%. The cellulose ester solutions may, naturally, also contain other additives such as are used in the production of the film supports in general, e.g. particularly dyestuffs of various types or pigments, in order to satisfy the optical requirements that are often imposed on the film support. The cellulose ester solutions may be cast into films of the required thickness by the usual processes by means of the conventional drum or band casting machines.

The film supports produced by the present process are transparent, of the highest optical homogeneity, and completely colorless. They are chemically inert and completely inert towards the photosensitive emulsions, and have a good dry and wet adhesion for gelatine layers.

The most important advantage, however, is that a photosensitive film produced using such film supports has an outstanding processing dimensional stability. The changes in length caused by the processing baths are much smaller than in a comparable material containing a cellulose ester film support produced without the additive of the present invention.

The process is illustrated in detail by the following examples.

EXAMPLE 1

Using a crude-film casting machine of conventional construction, a film support A of thickness 100μ is cast from a solution having the composition:

| | Parts by weight |
|---|---|
| Cellulose ester (with 61% of acetic acid) | 100 |
| Triphenyl phosphate | 7 |
| Dioctyl phthalate | 3 |
| Rosin | 10 |
| Methylene chloride | 375 |
| Methanol | 25 |

Under the same conditions, a conventional film support of the same thickness is cast from a solution having the composition:

| | Parts by weight |
|---|---|
| Cellulose ester (with 61% of acetic acid) | 100 |
| Triphenyl phosphate | 7 |
| Dioctyl phthalate | 3 |
| Methylene chloride | 375 |
| Methanol | 25 |

After drying both film supports are treated on both by a conventional coating process with an anchoring substrate having the composition:

| | Parts by weight |
|---|---|
| Gelatine | 1 |
| Water | 6 |
| Acetic acid | 1 |
| Methanol | 31 |
| Acetone | 49 |
| Methylene chloride | 12 | and dried.

Both film supports are then coated on one side with an antihalation layer of gelatine and suitable antihalation dyestuffs and on the other side with a photosensitive layer of gelatine-silver halide emulsion having the following properties:

| | |
|---|---|
| Ratio of AgCl to AgBr | 2:1 |
| Ratio of gelatine to silver halide | 1:1 |
| Silver halide coating weight g./m.$^2$ | 10 |

Finally, both films A and B are developed in a metol-hydroquinone developer of conventional composition (2 to 5 min. depending on the nature of the developer), fixed in a conventional fixing bath (about 5 min.), thoroughly washed, and dried.

The length measurement is carried out after suitable acclimatization (20° C./65% RH) both before and after development.

The difference between the two measurements, which gives the change in length resulting from the processing of the film, is given in the following table.

TABLE

| | Change in length of the film, in percent, resulting from processing | |
|---|---|---|
| | Longitudinal | Transverse |
| Part A (in accordance with the invention) | −0.005 | +0.010 |
| Part B (conventional) | −0.090 | −0.075 |

It can be seen that the dimensions of the material produced in accordance with the invention are practically unchanged on processing in the photographic baths, in contrast to the material produced from a conventional film support.

EXAMPLE 2

A film support A of thickness 85μ is cast on a crude-film casting machine of conventional construction from a solution having the following composition:

| | Parts by weight |
|---|---|
| Cellulose ester (with 61% of acetic acid) | 100 |
| Triphenyl phosphate | 15 |
| Polyester of ethylene glycol and phthalic acid [1] [specific gravity 1.302; refractive index (20° C.) 1.470; acidity, mg. KOH/g. 2–3; flash point 270° C.] | 15 |
| Methylene chloride | 495 |
| Ethanol | 55 |

[1] Commercial Weichharz MM.

Under the same conditions, a conventional film support B of the same thickness is cast from a solution having the composition:

| | Parts by weight |
|---|---|
| Cellulose ester (with 61% of acetic acid) | 100 |
| Triphenyl phosphate | 15 |
| Methylene chloride | 495 |
| Ethanol | 55 |

After drying both film supports are treated on both sides, by a conventional coating process, with an anchoring substrate having the following composition:

| | Parts by Weight |
|---|---|
| Gelatine | 1 |
| Water | 17 |
| Acetic acid | 1 |
| Methanol | 15 |
| Isopropanol | 8 |
| Acetone | 58 | and dried.

Both film supports are then coated on one side with an antihalation layer of gelatine and suitable antihalation dyestuffs and on the other side with a photosensitive layer of gelatine-silver halide emulsion having the following properties:

| | |
|---|---|
| Ratio of AgCl to AgBr | 2:1 |
| Ratio of gelatine to silver halide | 1:1 |
| Silver halide coating weight g./m.$^2$ | 10 |

Finally, both films A and B are developed in a metol-hydroquinone developer of conventional composition (2 to 5 min. depending on the nature of the developer), fixed in a conventional fixing bath (about 5 min.) thoroughly washed, and dried.

The length measurement is carried out after adequate acclimatization (20° C./65% RH) both before and after development. The difference between the two measurements, which gives the change in length caused by the processing of the film, is shown in the following table.

TABLE

| | Change in length of the film, in percent, resulting from the processing | |
|---|---|---|
| | Longitudinal | Transverse |
| Part A (in accordance with the invention) | −0.020 | −0.005 |
| Part B (conventional) | −0.105 | −0.080 |

It can be seen that the dimensions of the material produced in accordance with the present invention are practically unchanged on processing in the photographic baths, in contrast to the material produced from a conventional film support.

EXAMPLE 3

A film support A of thickness 140μ is cast on a crude-film casting machine of conventional construction from a solution having the composition:

| | Parts by Weight |
|---|---|
| Cellulose ester (with 52% acetic acid, and 10% of butyric acid) | 100 |
| Triphenyl phosphate | 7.5 |
| Tricresyl phosphate | 2.5 |
| Polyester of propylene glycol and adipic acid [1] (specific gravity 1.14; acidity, mg. KOH/g. 2; flash point 201° C.; viscosity, poise at 20° C. 1000) | 10 |
| Acetone | 333 |

[1] Commercial Witamol 615-PPA.

Under the same conditions, a conventional film support B of the same thickness is cast from a solution having the composition:

| | Parts by Weight |
|---|---|
| Cellulose ester (with 52% of acetic acid and 10% of butyric acid) | 100 |
| Triphenyl phosphate | 7.5 |
| Tricresyl phosphate | 2.5 |
| Acetone | 333 |

After drying, both film supports are treated on both sides, by a conventional coating process, with an anchoring substrate having the composition:

| | Parts by Weight |
|---|---|
| Gelatine | 1 |
| Water | 4 |
| Acetic acid | 1 |
| γ-Butyrolactone | 5 |
| Methanol | 36 |
| Acetone | 53 | and dried.

Both film supports are then coated on one side with an antihalation layer of gelatine and suitable antihalation dyestuffs and on the other side with a photosensitive layer of gelatine-silver halide emulsion having the following properties:

| | |
|---|---|
| Ratio of AgCl to AgBr | 2:1 |
| Ratio of gelatine to silver halide | 1:1 |
| Silver halide coating weight _____g./m.$^2$__ | 10 |

Finally, both films A and B are developed in a metol-hydroquinone developer of conventional composition (2 to 5 min. depending on the nature of the developer), fixed in a conventional fixing bath (about 5 min.), thoroughly washed, and dried.

The length measurement is carried out after adequate acclimatization (20° C./65% RH) both before and after development. The difference between the two measurements, which gives the change in length resulting from processing of the film, is shown in the following table.

TABLE

| | Change in length of the film, in percent, resulting from the processing | |
|---|---|---|
| | Longitudinal | Transverse |
| Part A (in accordance with the invention) | ±0.000 | +0.015 |
| Part B (conventional) | −0.090 | −0.075 |

It can be seen that the dimensions of the material produced in accordance with the invention are practically unchanged on processing in the photographic baths, in contrast to the material produced from a conventional film support.

EXAMPLE 4

A film support A of thickness 85μ is cast on a crude-film casting machine of conventional construction from a solution having the composition:

| | Parts by Weight |
|---|---|
| Cellulose ester (with 61% of acetic acid) | 100 |
| Triphenyl phosphate | 10 |
| Ketone resin of methyl ethyl ketone and Formalin[1] | 5 |
| Indene resin[2] | 5 |
| Methylene chloride | 520 |
| Methanol | 35 |

[1] Commercial Emekal 65 extra.
[2] Commercial Gebaganharz J 100 T.

Under the same conditions, a conventional film support B of the same thickness is cast from a solution having the composition:

| | Parts by weight |
|---|---|
| Cellulose ester (with 61% of acetic acid) | 100 |
| Triphenyl phosphate | 10 |
| Methylene chloride | 520 |
| Methanol | 35 |

After drying, both film supports are treated on both sides, by a conventional coating process, with an anchoring substrate having the composition:

| | Parts by weight |
|---|---|
| Gelatine | 1 |
| Water | 6 |
| Acetic acid | 1 |
| Methanol | 18 |
| Ethanol | 13 |
| Acetone | 49 | and dried.

Both film supports are then coated on one side with an antihalation layer of gelatine and suitable antihalation dyestuffs and on the other side with a photosensitive layer of gelatine-silver halide emulsions having the following properties:

| | |
|---|---|
| Ratio of AgCl to AgBr | 2:1 |
| Ratio of gelatine to silver halide | 1:1 |
| Silver halide coating weight _____g./m.$^2$__ | 10 |

Finally, both films A and B are developed in a metol-hydroquinone developer of conventional composition (2 to 5 min. depending on the nature of the developer), fixed in a conventional fixing bath (about 5 min.), thoroughly washed, and dried.

The length measurement is carried out after adequate acclimatization (20° C./65% RH) both before and after development. The difference between the two measurements, which gives the change in length resulting from the processing of the film, is shown in the following table:

TABLE

| | Change in length of the film, in percent, resulting from processing | |
|---|---|---|
| | Longitudinal | Transverse |
| Part A (in accordance with the present invention) | −0.015 | −0.010 |
| Part B (conventional) | −0.135 | −0.130 |

It can be seen that the dimensions of the material produced in accordance with the invention are practically unchanged on processing in the photographic baths, in contrast to the material produced from a conventional film support.

EXAMPLE 5

A film support A of thickness 125μ is cast on a crude-film casting machine of conventional construction from a solution having the following composition:

| | Parts by weight |
|---|---|
| Cellulose ester (with 52% of acetic acid and 10% of butyric acid) | 100 |
| Triphenyl phospate | 7.5 |
| Dibutyl phthalate | 2.5 |
| Sulfonamide resin[1] produced by condensation of arylsulfonamides with formaldehyde (softening point 62° C.; specific gravity 1.35; acidity mg. KOH/g. 1) | 15 |
| Methylene chloride | 375 |
| Methanol | 30 |
| Isopropanol | 25 |

[1] Commercial Santolite MHP.

Under the same conditions, a conventional film support B of the same thickness is cast from a solution having the composition:

| | Parts by weight |
|---|---|
| Cellulose ester (with 52% of acetic acid and 10% of butyric acid) | 100 |
| Triphenyl phosphate | 7.5 |
| Dibutyl phthalate | 2.5 |
| Methylene chloride | 375 |
| Methanol | 30 |
| Isopropanol | 25 |

After drying, both film supports are treated on both sides, by a conventional coating process, with an anchoring substrate having the composition:

| | Parts by weight |
|---|---|
| Gelatine | 1 |
| Water | 7 |
| Acetic acid | 1 |
| Methanol | 32 |
| Acetone | 59 | and dried.

Both film supports are then coated on one side with an antihalation layer of gelatine and suitable antihalation dyestuffs and on the other side with a photosensitive layer of gelatine-silver halide emulsion having the following properties:

| | |
|---|---|
| Ratio of AgCl to AgBr | 2:1 |
| Ratio of gelatine to silver halide | 1:1 |
| Silver halide coating weight _____g./m.$^2$__ | 10 |

Finally, both films A and B are developed in a methol-hydroquinone developer of conventional composition (2 to 5 min. depending on the nature of the developer), fixed in a conventional fixing bath (about 5 min.), thoroughly washed, and dried.

The length measurement is carried out after adequate acclimatization (20° C./65% RH) both before and after development. The difference between the two measurements, which gives the change in length, resulting from the processing of the film, is shown in the following table.

TABLE

| | Change in length of the film, in percent, resulting from processing | |
|---|---|---|
| | Longitudinal | Transverse |
| Part A (in accordance with the invention) | +0.005 | ±0.000 |
| Part B (conventional) | −0.100 | −0.090 |

It can be seen that the dimensions of the material produced in accordance with the invention are practically unchanged on processing in the photographic baths, in contrast to the material produced from a conventional film support.

The embodiments of the invention in which an exclusive property or privilege is claimed are defined as follows:

1. A photographic element having improved dimensional stability which comprises a support, a gelatine anchoring layer on said support and at least one light-sensitive silver halide gelatin layer, said support comprising an organic cellulose ester selected from the group consisting of cellulose acetate, cellulose propionate, cellulose acetate propionate, and cellulose acetate butyrate containing at least 5% of a low molecular weight plasticizer and about 1 to 25% of resin which is compatible with the cellulose ester and soluble in the solvent from which said ester is prepared, said percent of plasticizer and resin being based upon the weight of the cellulose ester.

2. A photographic element as defined in claim 1 where said cellulose ester is a cellulose acetate ester and said plasticizer is a low molecular weight phosphate ester or phthalate ester.

3. A photographic element as defined in claim 1 where said resin is a natural resin, a modified natural resin or a synthetic resin which are soluble in methylene chloride and methylene chloride-lower aliphatic alcohol mixtures.

4. A photographic element as defined in claim 3 where said resin is present in an amount of 5–15% by weight based on the weight of the cellulose ester.

References Cited

UNITED STATES PATENTS

| | | | | |
|---|---|---|---|---|
| 2,721,850 | 10/1955 | Hawtin et al. | | 260—16 |
| 2,770,555 | 11/1956 | Cornwell | | 106—173 |
| 3,054,673 | 9/1962 | Bostwick | | 96—87 |
| 3,277,032 | 10/1966 | Caldwell | | 97—87X |

RONALD H. SMITH, Primary Examiner

U.S. Cl. XR.

106—173; 260—16